(12) United States Patent
Kurtz

(10) Patent No.: US 6,935,184 B2
(45) Date of Patent: Aug. 30, 2005

(54) PRESSURE TRANSDUCER CAPABLE OF DETECTING INTERNAL LEAKAGE OF EXTERNAL MEDIA

(75) Inventor: Anthony D. Kurtz, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 10/405,159

(22) Filed: Apr. 2, 2003

(65) Prior Publication Data

US 2004/0194551 A1 Oct. 7, 2004

(51) Int. Cl.[7] .............................................. G01L 7/00
(52) U.S. Cl. ........................................................ 73/756
(58) Field of Search ......................... 73/700, 715, 716, 73/756; 277/318

(56) References Cited

U.S. PATENT DOCUMENTS

| 4,133,373 | A | * | 1/1979 | Slagley et al. ............. 165/11.1 |
| 5,187,973 | A | * | 2/1993 | Kunze et al. ............. 73/40.5 R |
| 5,284,061 | A | * | 2/1994 | Seeley et al. ................. 73/746 |
| 6,272,928 | B1 | | 8/2001 | Kurtz ............................ 73/715 |
| 6,330,829 | B1 | | 12/2001 | Kurtz et al. ................... 73/715 |
| 6,612,178 | B1 | * | 9/2003 | Kurtz et al. ................... 73/715 |
| 6,817,228 | B2 | * | 11/2004 | Upton et al. .................... 73/46 |
| 2003/0184018 | A1 | * | 10/2003 | Upton et al. ................. 277/318 |
| 2004/0135666 | A1 | * | 7/2004 | Kurtz et al. ................... 338/42 |
| 2004/0216514 | A1 | * | 11/2004 | Nunnally et al. .............. 73/40 |

* cited by examiner

*Primary Examiner*—William Oen
*Assistant Examiner*—Andre Allen
(74) *Attorney, Agent, or Firm*—Plevy, Howard & Darcy PC

(57) ABSTRACT

A pressure transducer capable of detecting leakage of media into the pressure transducer. The pressure transducer comprises a spacer having first and second ends. A first header assembly containing a first pressure sensor for measuring a pressure of the media, is sealingly disposed at the first end of the spacer. A second header assembly containing a second pressure sensor, is sealingly disposed at the second end of the spacer. The spacer, first header assembly, and second header assembly form a hermetically sealed leak detection cavity for capturing the media that leaks past the first header assembly. In operation, the media captured in the leak detection cavity generates a pressure which is sensed by the second pressure sensor.

23 Claims, 2 Drawing Sheets

PRESSURE TRANSDUCER CAPABLE OF DETECTING INTERNAL LEAKAGE OF EXTERNAL MEDIA

FIELD OF INVENTION

This invention relates to a pressure transducer and more particularly, to a pressure transducer that is capable of detecting very small leaks past the transducer's header.

BACKGROUND OF THE INVENTION

It is often necessary to use a pressure transducer to measure the pressure of a media that must be tightly contained. Often in the case of such media, even a very small leak in the header of the transducer can be highly dangerous. This problem is illustrated in FIG. 1 which shows a conventional pressure transducer including a pressure sensor 1 mounted to a standard header assembly 2. The header assembly 2 is coupled to a port element 7, which in turn, may be coupled to a pressure source. The port element 7 and the header assembly 2 are coupled to a transducer body element 3. Behind the header assembly 2 there is a large cavity 4 that houses the electronics. A typical leak path of the media, denoted by numeral 5, enters at the junction of the port element 7 and the housing 6 of the header assembly 2, and extends into the cavity 4.

Pressure transducers, such as illustrated in FIG. 1, currently used for measuring such media, are commonly leak checked before installation in the field. These leak checks involve pressurizing the transducer with a gas, such as helium, and measuring the rate at which the helium leaks past the header assembly 2 into the cavity 4.

There are two problems with this leak checking method. The first problem is that the test must be done in a special test fixture and can not easily be performed when the pressure transducer is installed for normal use. This means that any leak that develops after installation will go unnoticed until a new periodic leak check is done. The second problem is that even highly accurate leak checkers have a finite resolution below which a leak can not be detected. For most applications this resolution is more than adequate for safety needs. However, there are some applications involving highly volatile or poisonous gases, where even a miniscule leak is unacceptable.

Thus, highly accurate leak detection, which can be performed while a pressure transducer is installed in the field, is needed.

SUMMARY OF INVENTION

A pressure transducer is disclosed, which is capable of detecting leakage of media into the pressure transducer. The pressure transducer comprises a first header assembly containing a first pressure sensor for measuring a pressure of the external media. A leak detection cavity is formed behind the first header assembly for capturing the external media that leaks past the first header assembly. A second pressure sensor is provided for measuring pressure generated by the external media captured in the leak detection cavity.

DETAILED DESCRIPTION

The present invention is a pressure transducer comprising a sealed leak detection cavity behind the header of the transducer and a second pressure sensor for sensing pressure within the leak detection cavity. The leak detection cavity and corresponding pressure sensor allows very small leaks to be detected in the housing of the transducer's header. The leak detection cavity is situated such that any leak in the header will vent into the cavity. In this way the pressure in the leak detection cavity will slowly build up as more of the leaking media enters the cavity. By looking at the ideal gas law $PV=nRT$ where P is the pressure, V is the volume, n is the number of moles, R is the Rydberg gas constant, and T is the temperature, it can easily be seen that, if V and T are held constant, as the number of moles in the leak detection cavity increases, the pressure P in the cavity will increase.

The leak detection cavity is preferably sized much smaller than the cavity typically located behind the header of the transducer to enable the pressure caused by a leak to build up quickly, making for earlier leak detection. Using the ideal gas law, for a constant temperature and a given number of moles of gas, a reduction in gas volume will result in an increase in gas pressure, which is more easily detected. Conversely, for a given pressure threshold, a smaller gas volume will result in a smaller number of moles of gas to fill the chamber to detect the leak. Accordingly, the early detection of a leak will enable the user to take appropriate action before any of the media has actually leaked out of the transducer because the pressure in the leak detection cavity will be measurable at a relatively low pressure.

Figure 2:
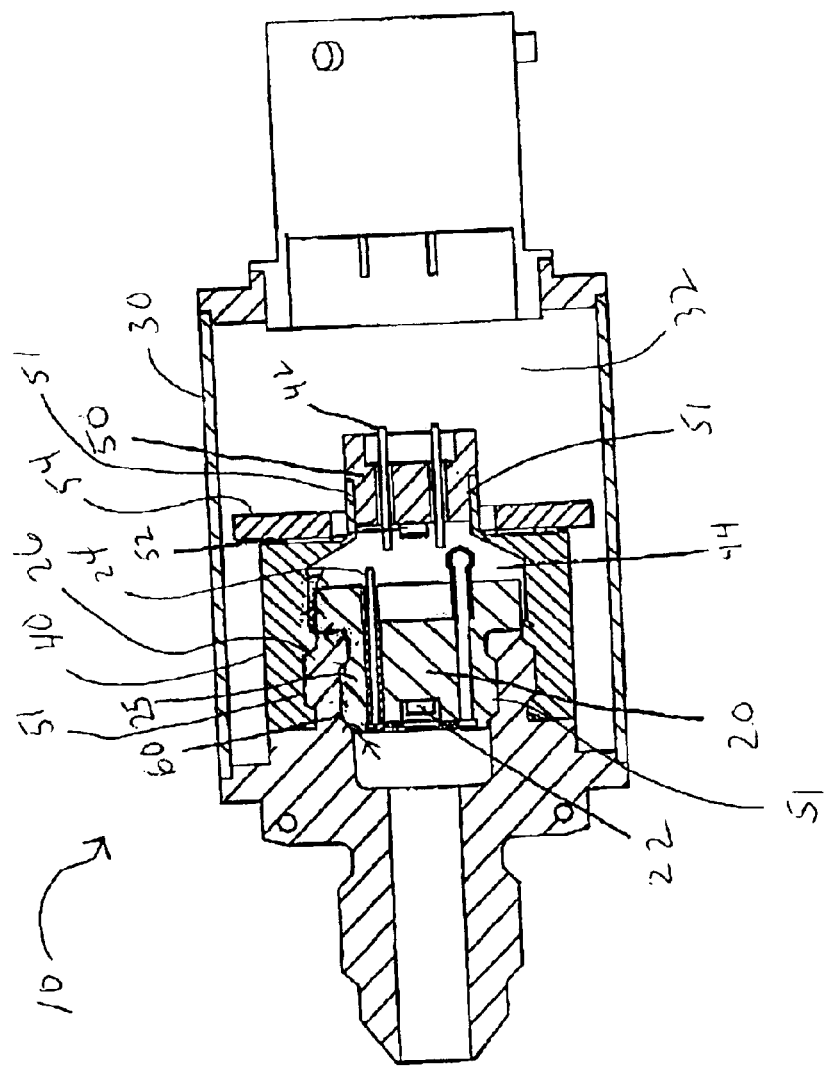
FIG. 2 is a sectional view of an embodiment of a pressure transducer made according to the principles of the present invention.

FIG. 2 shows an embodiment of a pressure transducer 10 which incorporates the leak detection principles of the present invention. The pressure transducer 10 generally includes a first header assembly 20, a first pressure sensor 22 mounted to the first header assembly 20 using any suitable known method, and a transducer body element 30 joined with the first header assembly 20 using any suitable known method. The first header assembly 20 includes electrical connection pins 24 for electrically coupling the first pressure sensor 22 to appropriate pressure transducer electronics. The connection pins 24 are electrically isolated from the first header assembly 20 with glass seals which also hermetically seal the first header assembly 20. The first header assembly 20 and the first pressure sensor 22 are similar to the header assemblies and pressure sensors of the pressure transducers described in U.S. Pat. No. 6,272,928 entitled HERMETICALLY SEALED ABSOLUTE AND DIFFERENTIAL PRESSURE TRANSDUCERS, issued to Anthony D. Kurtz, and U.S. Pat. No. 6,330,829 entitled IMPROVED OIL FILLED PRESSURE TRANSDUCER, issued to Anthony D. Kurtz et al., both of which are assigned to Kulite Semiconductor Products Inc., the assignee herein. The leak detection principles of the present invention can also be applied to other pressure transducer designs as well.

Figure 1:
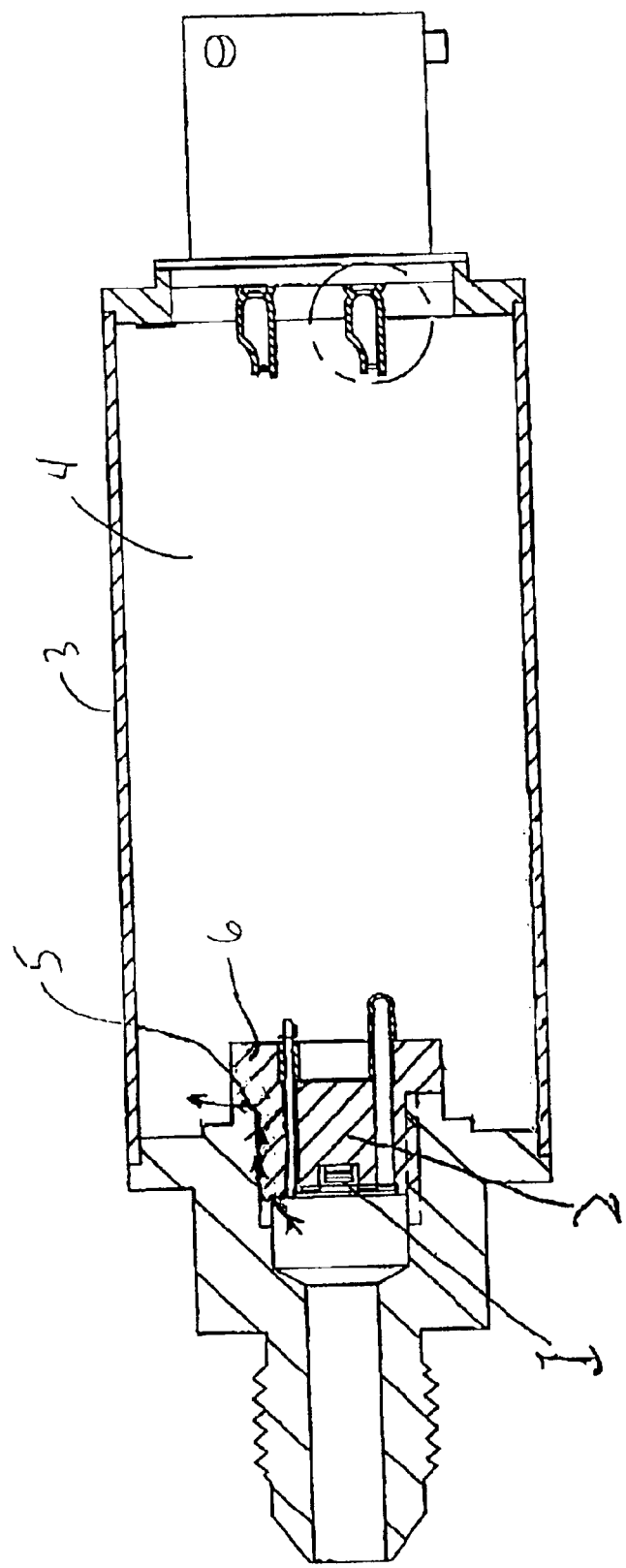
FIG. 1 is a sectional view of a convention pressure transducer that is typically used in gas measurement applications.

Referring still to FIG. 2, the leak detection principles of the present invention may be implemented by providing within the transducer body element 30, a tubular spacer ring 40, having a first open end which receives the first header assembly 20, and a second open end which receives a second header assembly 50, that mounts a second pressure sensor 52. Welds 51 are provided for coupling and hermetically sealing the spacer ring 40 to the first and second header assemblies 20, 50. A small, hermetically sealed leak detection chamber or cavity 44, bounded by the spacer ring 40, is formed between the first and second header assemblies 20, 50. The spacer ring 40 is sized so that the leak detection cavity 44 may be one one hundredth (0.01) as large as the cavity found behind the header assembly of a conventional pressure transducer as shown in FIG. 1.

For example, in one embodiment, a conventional pressure transducer body element may be about 0.5 inches in diameter by about 1.0 inches in length, resulting in an internal cavity having a volume of about 0.2 cubic inches. The leak detection cavity 44 of the transducer of the present invention may then have a volume of one one hundredth of the conventional transducer, or about 0.002 cubic inches. A leak detection cavity 44 of such a volume could be realized in one embodiment, by constructing a body element 30 having a diameter of about 0.3 inches and a length of about 0.03 inches.

In any case, the small size of the leak detection cavity 44 of the present invention is very important, as the larger the leak detection cavity 44, the longer it takes for a leak to fill it to an easily measured pressure level. For a leak detection cavity as large as the cavity 4 shown in FIG. 1, it may take well over a year for a typical small leak to fill it to about 5 PSI.

Referring again to FIG. 2, the second header assembly 50 mounts the second pressure sensor 52 in a manner which exposes it to the leak detection cavity 44, thus, enabling the second pressure sensor 52 to measure the low pressures including, but not limited to 5 PSI, that can build up in the leak detection cavity 44 if a leak occurs, for example, along the pathway indicated by numeral 60 between the housing 25 of the header assembly 20 and a transducer port 26.

A second cavity 32 is formed essentially by the transducer body element 30, a washer-shape electronics printed circuit board 54 containing active or passive electronics, disposed about the second header assembly 50 and joined with the spacer ring 40, and the second header assembly 50. The second cavity 32 may house conventional pressure transducer electronics (not shown) and may be as large as needed, because it is sealed off from the leak detection cavity 44 and will not see the media even under leak conditions.

The second header assembly 50 includes electrical connection pins 42, which communicate with both the leak detection cavity 44 and the second cavity 32 for electrically coupling the first pressure sensor 22 and the second pressure sensor 52 to the pressure transducer electronics, which may be disposed in the second cavity 32. The connection pins 42 are electrically isolated from the second header assembly 50 with glass seals which also hermetically seal the second header assembly 50.

The pressure transducer of FIG. 2 will allow for the relatively quick detection of very small leaks. For example, a leak rate of $1 \times 10^{-7}$ cm$^3$/s may produce a 5 PSI pressure in such a cavity in about twenty (20) days as compared to over a year using convention leak detection methods. The ability to detect leaks in about twenty (20) days typically provides more than sufficient time before such a leak causes a problem, especially with the leak contained in the sealed leak detection cavity. Because the pressure in the leak detection cavity 44 will be measurable at a relatively low pressure, there is little chance of a leak to the second cavity 32 or a leak outside the body element 30.

While the foregoing invention has been described with reference to the above embodiment, various modifications and changes can be made without departing from the spirit of the invention. Accordingly, all such modifications and changes are considered to be within the scope of the appended claims.

What is claimed is:

1. A pressure transducer comprising:
    a first header assembly containing a first pressure sensor for measuring a pressure of external media,
    a leak detection cavity formed behind the first header assembly for capturing the external media that leaks past the first header assembly; and
    a second pressure sensor for measuring pressure generated by the external media captured in the leak detection cavity.

2. The pressure transducer according to claim 1, further comprising a spacer, the first header assembly sealingly disposed at a first end of the spacer.

3. The pressure transducer according to claim 2, further comprising a second header assembly which contains the second pressure sensor.

4. The pressure transducer according to claim 3, wherein the second header assembly is sealingly disposed at a second end of the spacer.

5. The pressure transducer according to claim 4, further comprising a transducer body element joined with the first header assembly.

6. The pressure transducer according to claim 5, wherein the transducer body element defines a second cavity that houses pressure transducer electronics.

7. The pressure transducer according to claim 6, wherein the second cavity is sealed off from the leak detection cavity.

8. The pressure transducer according to claim 6, wherein the second header assembly includes electrical connection pins for electrically coupling the first pressure sensor and the second pressure sensor to the pressure transducer electronics.

9. The pressure transducer according to claim 1, further comprising a transducer body element joined with the first header assembly.

10. The pressure transducer according to claim 9, wherein the transducer body element defines a second cavity that houses pressure transducer electronics.

11. The pressure transducer according to claim 10, wherein the second cavity is sealed off from the leak detection cavity.

12. A pressure transducer capable of detecting internal leakage of external media, the pressure transducer comprising:
    a spacer having first and second ends;
    a first pressure sensor for measuring a pressure of external media;
    a first header assembly mounting the first pressure sensor, the first header assembly sealingly disposed at the first end of the spacer;
    a second header assembly sealingly disposed at the second end of the spacer;
    the spacer, first header assembly, and second header assembly forming a hermetically sealed leak detection cavity for capturing external media that leaks past the first header assembly;
    a second pressure sensor mounted on the second header assembly for measuring pressure generated by the external media captured in the leak detection cavity.

13. The pressure transducer according to claim 12, further comprising a transducer body element joined with the first header assembly.

14. The pressure transducer according to claim 13, wherein the transducer body element defines a second cavity that houses pressure transducer electronics.

15. The pressure transducer according to claim 14, wherein the second cavity is sealed off from the leak detection cavity.

16. The pressure transducer according to claim 14, wherein the second header assembly includes electrical connection pins for electrically coupling the first pressure sensor and the second pressure sensor to the pressure transducer electronics.

17. The pressure transducer according to claim 16, wherein the electrical connection pins which communicate with both the leak detection cavity and the second cavity.

18. The pressure transducer according to claim 12, further comprising a transducer body element joined with the first header assembly.

19. The pressure transducer according to claim 18, wherein the transducer body element defines a second cavity that houses pressure transducer electronics.

20. The pressure transducer according to claim 19, wherein the second cavity is sealed off from the leak detection cavity.

21. A pressure transducer comprising:
a first header assembly containing a first pressure sensor for measuring a pressure of external media,
a leak detection cavity formed behind the first header assembly for capturing the external media that leaks past the first header assembly;
a second pressure sensor for measuring pressure generated by the external media captured in the leak detection cavity; and
a second cavity formed behind the second pressure sensor that houses pressure transducer electronics.

22. The pressure transducer according to claim 21, wherein the first cavity is substantially smaller than said second cavity.

23. The pressure transducer according to claim 22, wherein the first cavity is approximately one one hundredth (0.01) as large as said second cavity.

* * * * *